Jan. 10, 1967 R. V. MEYER 3,297,879

OPTICAL ENCODER RESPONSIVE TO MOVEMENT IN TWO DIRECTIONS

Filed March 18, 1963 2 Sheets-Sheet 1

INVENTOR
ROBERT V. MEYER

BY Dodge and Sons

ATTORNEYS

Jan. 10, 1967 R. V. MEYER 3,297,879

OPTICAL ENCODER RESPONSIVE TO MOVEMENT IN TWO DIRECTIONS

Filed March 18, 1963 2 Sheets-Sheet 2

INVENTOR
ROBERT V. MEYER

BY Dodge and Sons

ATTORNEYS

United States Patent Office 3,297,879
Patented Jan. 10, 1967

3,297,879
OPTICAL ENCODER RESPONSIVE TO MOVEMENT IN TWO DIRECTIONS

Robert V. Meyer, Mechanicville, N.Y., assignor to W. & L. E. Gurley, Troy, N.Y., a corporation of New York Filed Mar. 18, 1963, Ser. No. 265,701
5 Claims. (Cl. 250—237)

This invention relates to optical encoders, and particularly to optical encoders for producing trains of pulses indicative of the X and Y coordinates of points located in a plane. It will be understood that the term "X and Y coordinates" means the two line segments drawn from a point in a plane each to one, and parallel to the other, of two lines crossing each other in a plane. In the description herein, the X and Y coordinates of a point are its rectangular Cartesian coordinates.

In some fields, for example, in map making, it sometimes is necessary to convert an irregular curve into digital form. This is done by producing a series of pulses indicative of the X and Y coordinates of various points along the curve. The usual mechanism employed includes a crosshead having perpendicular guideways that are parallel with the X and Y axes, and which carries a stylus that is used to trace the X and Y distances between a reference point and the points on the curve whose coordinates are to be converted into digital form. Each guideway is equipped with an optical encoder that comprises a glass strip or scale carrying an opaque coating in which are ruled a series of evenly spaced parallel lines, and a reading head that includes a light source and a photocell positioned at opposite sides of the scale. The scale and the reading head of each encoder are fixed to the two relatively movable parts of the associated guideway, and, therefore, during movement of the crosshead in the direction of either the X or the Y axis, the beam of light passing from the source to the photocell in one encoder is periodically interrupted by the opaque spaces between the ruled lines. This periodic interruption of the light beam causes the output of the photocell to pulsate, and the number of pulses produced as the stylus traces the X or Y distance between a reference point and any given point on the curve is indicative of the X or Y coordinate of that point. The two series of pulse trains representing the X and Y coordinates of points along the curve usually are recorded and subsequently read out in timed relation and used to control a machine tool that is reproducing the traced curve.

While this known X–Y encoder system is satisfactory in some cases, it does possess certain inherent disadvantages which limit its usefulness. In the first place, since the scales and reading heads of the two encoders are separate, it is extremely difficult to mount these parts so that the encoders sense motion along paths that are truly perpendicular to each other. In those instances where great accuracy is required, adjustment of the mechanism requires considerable time. In addition, this prior scheme is limited to a crosshead type of mechanism which includes guideways with which the encoders can be associated, and cannot be used with other freer moving mechanisms, such as the four-bar parallel linkage. Since the crosshead can be moved only in directions parallel with the X and Y guideways and, therefore, direct tracing of an irregular curve is precluded, it is necessary to obtain coordinate data for many discrete points along the curve. This is a time consuming procedure involving substantial risk of error and inaccuracy.

The object of this invention is to provide an improved X–Y encoder which inherently results in more accurate measurements than the scheme discussed above and which is capable of being used with the freer moving four-bar parallel linkage. In accordance with this invention, the X and Y scales are combined into a single, accurately formed grid comprising first and second, crossed sets of spaced parallel bands having one light-affecting characteristic and defining two crossed sets of parallel columns of spaced areas having a different light-affecting characteristic. This grid is read by a single reading head incorporating a light source for illuminating a portion of the grid, a first optical system including a photocell for reading the bands parallel with the X axis, and a second optical system including another photocell for reading the bands parallel with the Y axis. The angular relationship between the two sets of bands is built into the grid during its manufacture and is not in any way dependent upon assembly as in the case of the prior art device. In addition, the use of the grid eliminates the need for the separate guideways characterizing the crosshead. With the present invention, alignment between the grid and the reading head can be maintained during relative movement between these parts by free moving linkages, such as the four-bar parallel linkage, thus permitting easy, accurate, direct tracing of the curve.

In its preferred form, the invention employs a grid made up of light reflecting and non-reflecting areas. This arrangement permits both photocells and the light source to be mounted at the same side of the grid and simplifies greatly the traversing mechanism. This embodiment also employs an additional photocell for detecting motion along each axis which receives images of the grid that are out of phase with those received by the other photocell. This arrangement renders the encoder direction sensitive.

The preferred and several alternate embodiments of the invention are described herein with reference to the accompanying drawings in which.

Figure 1:
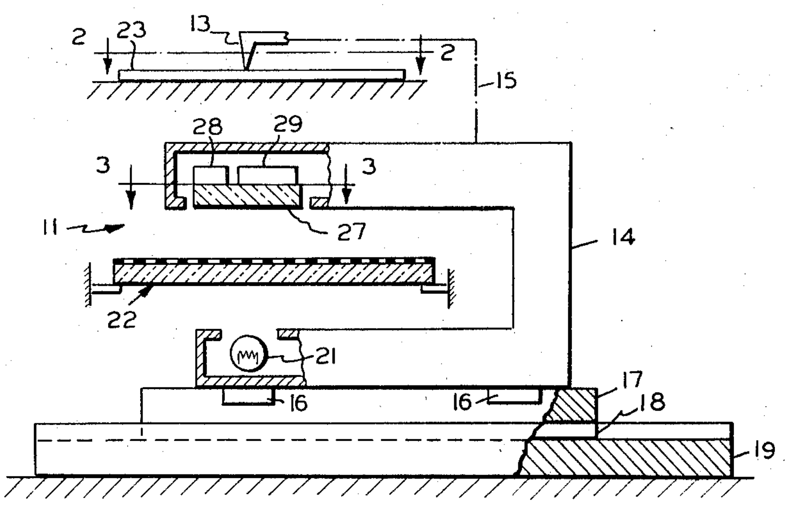
FIG. 1 is an elevation view, in schematic form, of a simplified X–Y reading system incorporating a light transmitting grid.
Figure 2:
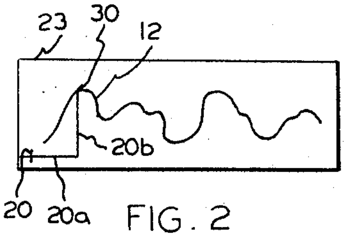
FIG. 2 is a sectional view taken on line 2—2 of FIG. 1 showing a typical curve which is to be converted into digital form.
Figure 3:
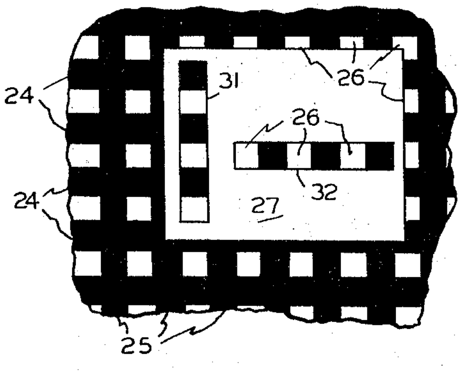
FIG. 3 is a sectional view taken on line 3—3 of FIG. 1 showing, on a greatly exaggerated scale, the photocell slit plate and the underlying grid.

As shown in FIGS. 1–3, the X–Y encoder 11 of the present invention is employed to produce pulse trains corresponding to the X and Y coordinates of points along a curve 12 that is being traced by a stylus 13. The encoder 11 includes a C-shaped casing 14 connected with the stylus 13 through a suitable mechanical link indicated at 15 and provided with parallel guides 16 which ride in ways formed in the plate 17 of a crosshead. Plate 17, in turn, carries parallel guides 18 which ride in a set of ways formed in base 19. The ways in plate 17 and in base 19 are perpendicular to each other.

The lower leg of the encoder casing 14 contains a lamp 21 arranged to illuminate the overlying portion of a grid 22 mounted between the legs and arranged parallel with the plate 23 bearing the curve 12. The grid 22 is formed on a sheet of glass and, as shown in FIG. 3, comprises two perpendicular, crossed sets of spaced opaque bands 24 and 25, respectively, that define the perpendicular sets of spaced clear areas 26. The bands 24 and 25 and the spaces between them are of equal width, and in a typical case this dimension is .005 inch. The grid 22 is so mounted that bands 24 and 25 are parallel with the guides 18 and 16, respectively. The light transmitted by the transparent areas 26 of the grid passes through a slit plate 27 mounted in the upper leg of the C-shaped casing 14 and forms on the active face of each of two photocells 28 and 29 mounted above the slit plate an image of a section of the illuminated portion of the grid 22. The slit plate 27 also is made of glass and carries an opaque coating in which are formed two perpendicular slits 31 and 32. The slit 31, which for convenience will be termed the X slit, has a width which is an odd multiple of the width of the bands 25 and a length that is an even multiple of the width of the bands 24. The slit 32, which is termed the Y slit, has a width which is an odd multiple of the width of bands 24 and a length that is an even multiple of the width of the bands 25. In the illustrated embodiment, bands 24 and 25 are of equal width and the odd multiples are both one. Therefore, the width of slits 31 and 32 is equal to the width of the bands. The even multiple in the case of each illustrated slit is six, but it will be obvious that other multiples can be used and that the slits 31 and 32 need not be of equal length. Slit plate 27 is so positioned that slits 31 and 32 are parallel with bands 25 and 24, respectively, and it will be understood that the active face of photocell 28 overlies the entire area of slit 31 and that the active face of photocell 29 overlies the entire area of slit 32.

When the casing 14 of the reading head is positioned to produce the relative orientation of slit plate 27 and grid 22 shown in FIG. 3, one-half of each of the slits 31 and 32 overlies spaces 26. Since, at this time, the amount of light transmitted from source 21 to the photocells 28 and 29 is a maximum, the outputs of the photocells are a maximum. If the reading head is now moved in a direction parallel with the bands 24, i.e., in the X direction, slit 31 will be gradually obscured by one of the bands 25 and consequently the output of photocell 28 will gradually decrease. When the reading head reached a position in which slit 31 overlies a band 25, the output of the photocell will be zero. As the reading head moves beyond that position, slit 31 gradually uncovers three of the spaces 26 in the next column, and therefore, the output of photocell 28 commences to increase. It will be apparent that as movement continues, there will be a periodic decrease and increase, i.e., pulsation, in the output of photocell 28. The number of pulsations depends upon the number of bands 25 which have been crossed and thus is indicative of the distance traveled. During this movement in the X direction, the total area of the spaces 26 underlying photocell 29 is constant. Therefore, the output of photocell 28 remains unchanged. From what has been said, it should be obvious that if the reading head is moved along the ways of guides 16, i.e., moved in the Y direction, the output of photocell 29 will pulsate and the output of photocell 28 will remain constant.

The encoder of FIG. 1 is not direction sensitive and, therefore, in obtaining a digital indication of the coordinates of points along curve 12, measurements are made with respect to a reference point, such as point 20, located off the curve in both the X and the Y directions. In the process of converting the coordinates of a typical point 30 into digital form, the stylus 13 is first positioned above the reference point 20 and the counters or other recorders which receive the outputs of the photocells are set to a zero or reference condition. The stylus is then moved in the direction of the X axis along line **20*a* to the intersection with line 20*b*, which is normal to this axis and passes through point 30, and then along line 20*b* to the point 30 on curve 12. The sums of the pulses generated by the X and Y photocells 28 and 29, respectively, during this movement of the stylus are representative of the X and Y coordinates of point 30. In a similar manner, digital representations of the coordinates of other points along curve 12** are obtained and then recorded, read out and utilized in a manner known in the art.

Since the area of each of the clear spaces 26 on a typical grid is quite small, the amount of light that impinges on the photocells is also rather small. Furthermore, accumulations of foreign matter on the grid 22 could easily obscure one or more of the spaces 26 and thus affect the accuracy with which the X and Y movements can be detected. In order to overcome these disadvantages, it is recommended that a plurality of slits be used with each photocell. Thus, in FIG. 4, the slit plate **27*a* employs two groups of four spaced parallel slits 31*a* and 32*a* for detecting movement in the X and Y directions, respectively. The spacing between slits in the X and Y groups is equal to the width of bands 25*a* and 24*a*, respectively, and it will be understood that the active face of the X photocell overlies all of the X slits and that the active face of the Y photocell overlies all of the Y slits. Since all of the slits in each group are in phase, i.e., all slits form the same image of grid 27*a*** on the associated photocell, the operation of this embodiment is the same as the operation of the FIG. 1 embodiment except that the magnitudes of the outputs of the photocells are increased and the risk of erratic indication resulting from dirt accumulation on the grid is reduced.

Figure 4:
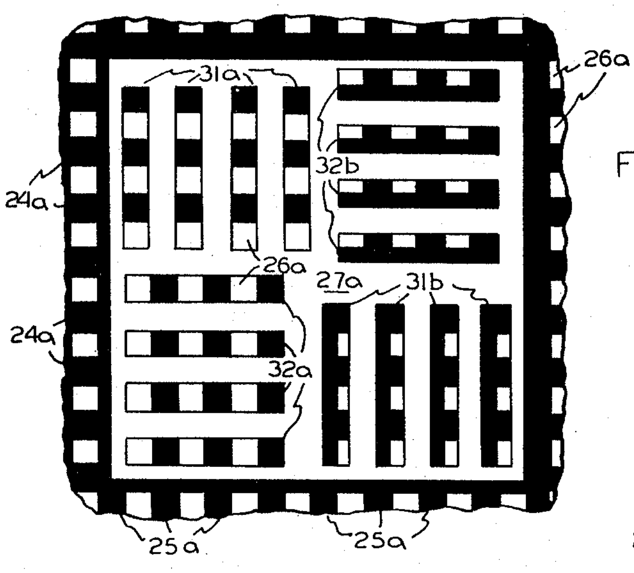
FIG. 4 is a view similar to FIG. 3 showing another form of slit plate.

The embodiments of the invention described thus far are insensitive to the direction moved by the reading head along the X and Y axes, respectively. Therefore, with this apparatus, it is essential that the operator avoid overshooting curve 12 with the stylus 13 because the return movement required to correct an overshoot would produce additional pulses indistinguishable from those previously generated, and thus would indicate a coordinate different from the real one for the point in question. Furthermore, this apparatus cannot be used for point-to-point tracing along the curve where the curve has a reverse bend, but can only give the desired coordinates with reference to a fixed reference point located off the curve. In order to overcome these disadvantages, the instrument is made direction sensitive by incorporating in it an additional pair of X and Y photocells and means for forming on the active faces of these photocells images which are out of phase with the images on the corresponding original photocells by an amount other than 180°. As shown in FIG. 4, which illustrates a slit plate for a direction sensitive encoder the plate **27*a* includes a second group of spaced, parallel X slits 31*b* which are parallel with and the same size as slits 31*a* but which are out of phase with the slits 31*a* by 90° in the direction of the X axis, and a second group of spaced, parallel Y slits 32*b* which are parallel with and the same size as slits 32*a* but which are out of phase with slits 32*a* by 90° in the direction of the Y axis. It will be understood that these auxiliary slits 31*b* and 32*b*** are covered by the active faces of a second pair of photocells (not shown).

When the slit plate **27*a* is in the position shown in FIG. 4, each slit 31*a* is in full registration with the spaces 26*a* so the output of the associated photocell is a maximum. Each slit 31*b*, on the other hand, uncovers only one-half of each of the spaces 26*a*, and, therefore, the output of the photocell associated with these slits is one-half the maximum value. If the reading head, and consequently the slit plate 27*a*, is shifted to the right (as viewed in FIG. 4) along the X axis, the quantity of light transmitted to the photocell overlying slits 31*a* will gradually decrease, and so too will the output of the associated photocell. During this movement, the amount of light passing through slits 31*b* will increase gradually to a maximum occurring when the slit plate has moved one-half the width of a band 25*a*, and then decrease to the original value. If the slit plate 27*a* is shifted to the left along the X axis from the FIG. 4 position, the amount of light transmitted through both the slits 31*a* and 31*b* will gradually decrease and so too will the outputs from the associated photocells. When the slit plate 27a initially assumes a position in which the slits 31a overlie bands 25a, rightward movement from that position along the X axis increases and decreases, respectively, the outputs from the photocells overlying slits 31a and 31b, and leftward movement along this axis increases the outputs of both photocells. From this discussion, it will be apparent that regardless of initial position, movement in one direction along the X axis will change the outputs of the two X photocells in the same sense and movement in the opposite direction along that axis will change the outputs of these photocells in opposite senses. Therefore, the changing output of one of the photocells may be used to indicate the magnitude of the movement and a comparison of the outputs of the two cells indicates the direction of the movement. Similarly, the outputs of the two Y photocells overlying the slits 32a and 32b** may be used to indicate the magnitude and direction of movement along the Y axis.

The embodiments of the invention described above all use what I term a transmission grid, i.e., a grid which forms a pulse pattern by transmitting selected portions of the incident light. In contrast to this, the preferred form of the invention shown in FIG. 5 uses a reflection grid. In this case, the grid 33 comprises non-reflective bands 34 which are superposed on the reflective surface 35 of a base 36. The geometry of grid 33 is exactly the same as the geometry of the grids shown in FIGS. 3 and 4.

Figure 5:
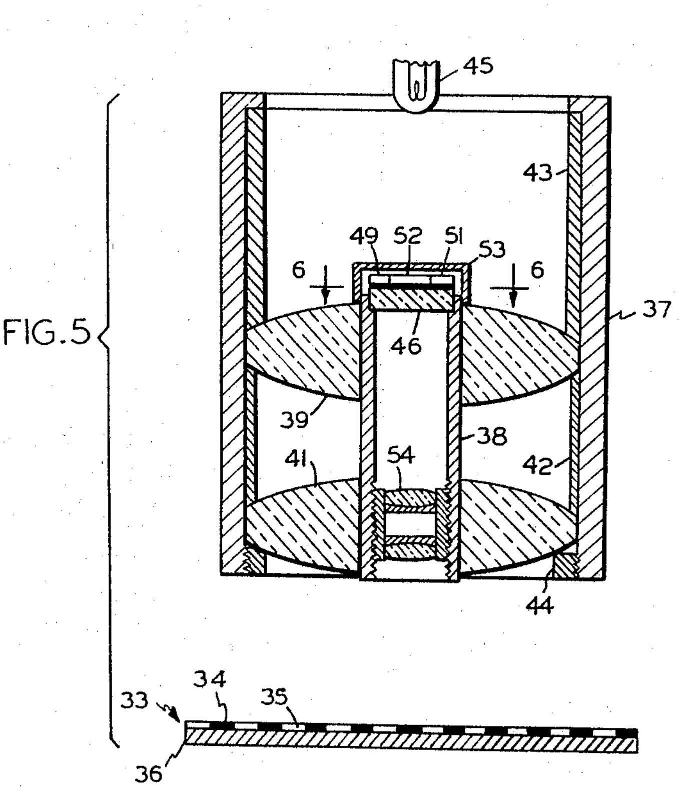
FIG. 5 is a sectional view of the preferred reading head.

The reading head in the FIG. 5 embodiment, which is the preferred embodiment, comprises a pair of coaxial tubes 37 and 38 which are spaced radially from each other to define an intervening annular space in which are mounted two annular, biconvex, symmetrical condensing lenses 39 and 41. The inner tube 38 is fixed to the condensing lenses by any suitable means, for example, an adhesive. The lenses 39 and 41 are spaced from each other by a sleeve 42 and are clamped in place between a spacer sleeve 43, that abuts an inturned shoulder on tube 37, and a threaded ring 44. Positioned above the lenses 38 and 39 is a lamp 45 that is held in place by suitable means not shown. The light rays from this lamp are converged by the condensing lenses and illuminate an annular portion of grid 33 coaxial with the axes of tubes 37 and 38. The upper end of the inner tube 38 is counterbored to receive a glass slit plate 46 whose upper surface carries an opaque coating in which are formed equiangularly spaced groups of slits 47 and 47a, 48 and 48a, which are analogous to the slits 31a, 31b, 32a and 32b, respectively, discussed above in connection with FIG. 4. The slits 47, 47a, 48 and 48a lie beneath the active faces of four photocells (three being shown in FIG. 5 at 49, 51 and 52) that are mounted on the top of the slit plate and shielded from lamp 45 by a cap 53 that fits over the end of tube 38. Images of sections of the illuminated annular portion of grid 33 are projected onto the active faces of the photocells, which faces lie in a common plane, through the slits in plate 46 by an objective lens 54. A suitable objective lens is the Wollensak #811, 13 mm.-*f* 1.9 camera lens.

The objective lens is used at a 1:1 image-to-object ratio and, therefore, grid 33 is positioned in a plane located below the objective lens a distance equal to twice its front focal length, and the active faces of the photocells are positioned in a plane located above the objective lens a distance equal to twice its back focal length. The condenser lenses are also used at an image-to-object ratio of 1:1 and the back focal length of lens 41 is twice the front focal length of the objective lens. With this arrangement, the condenser lens 41 is spaced from the grid 33 substantially the same distance as the objective lens and the image of lamp 45 is formed at the first nodal point of the objective lens. As a result, substantially all of the light reflected from the grid passes through the objective lens and losses due to impingement of light rays upon the objective lens mount are minimized. The lamp 45, of course, is spaced from the upper condenser lens 39 a distance equal to its front focal length. Since the light between the condenser lenses 39 and 41 is considered to be collimated, the upper condenser lens 39 can be positioned closely adjacent the plane of the faces of the photocells (i.e., the back focal plane of the objective lens) thus minimizing light loss resulting from shadowing of the condenser lens 39 by the upper end of tube 38.

Figures 6, 7:
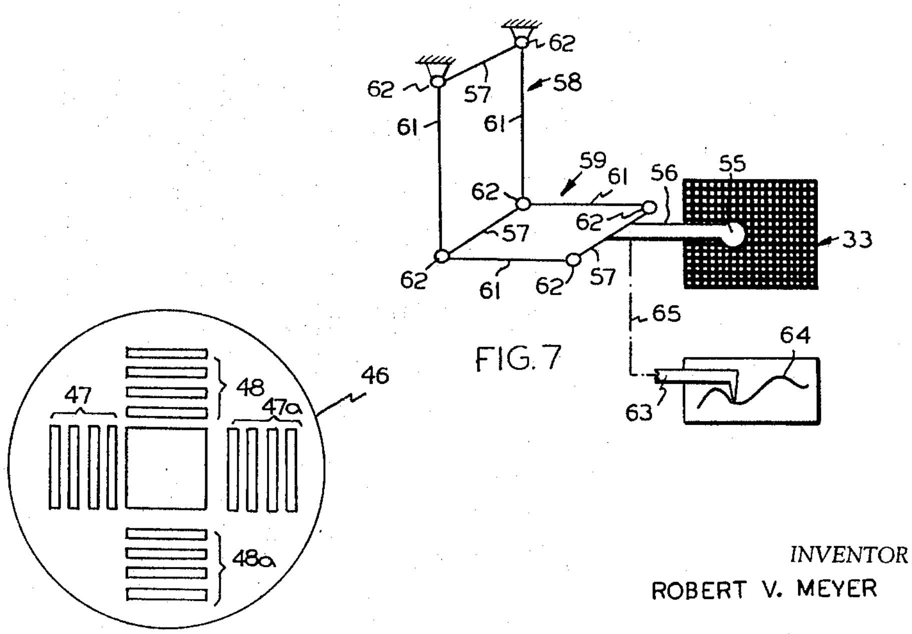
FIG. 6 is a view taken on line 6—6 of FIG. 5 showing, on a greatly enlarged scale, the slit plate used in the preferred embodiment.
FIG. 7 is a schematic diagram of a typical free moving linkage system in which the invention may be used.

While the reading head of the FIG. 5 embodiment may be mounted on a crosshead, as was the reading head of the FIG. 1 embodiment, it usually is more convenient to mount it on a free moving linkage, such as the well known four-bar parallel linkage, one form of which is commonly used in drafting machines. FIGURE 7 is a diagrammatic representation of such an installation. As shown in this figure, the reading head, indicated at 55, is carried by a support 56 fixed to one of the cross bars 57 of a parallel arm linkage. In essence this linkage comprises two parallelogram frames 58 and 59 each of which includes a pair of arms 61 which are pivotally connected at points 62 to the cross bars 57. One of the bars 57 is common to both frames and the pivots 62 at one end of frame 58 are fixed to a supporting base. The reading head 55 is positioned above the reflective grid 33 and its slits 47, 47a, 48 and 48a are aligned with the Y and X bands, respectively, in the grid. Since the bars 57 remain parallel with each other as the head 55 is moved over the grid, this alignment is maintained throughout operation of the encoder. The stylus 63, with which the operator traces the curve 64, is connected with the support 56 by a link indicated at 65 so that the reading head follows the movement of the stylus.

In the operation of the embodiment of FIGS. 5–7, the lamp 45 illuminates an annular portion of grid 33 coaxial with the reading head and the objective lens 54 and the slits 47, 47a, 48 and 48a form images of sections of the illuminated portion of the grid on the active faces of the four photocells. As in the case of the preceding embodiment, one pair of photocells generates pulses indicative of the magnitude and direction of movement along the X axis and the other pair generates pulses indicative of the magnitude and direction of movement along the Y axis. However, in this case, the use of a free moving linkage permits the operator to follow exactly the curve 12, i.e., he may move the stylus, and consequently the reading head 55, in oblique directions.

In using the arrangement of FIG. 7 to convert curve 64 into digital form, the operator positions stylus 63 on one end of the curve and sets the recorders connected with the photocells to reference conditions. He then proceeds to move the stylus along the curve. When the stylus traces a portion of curve 64 that is parallel with either the X or Y axis, then, as explained above, one of the pairs of photocells in the reading head will produce a cyclically changing output, while the other pair produces a constant output. On the other hand, when the stylus is tracing in any other direction, the outputs of both pairs of photocells will pulsate. It should be apparent that this device affords a faster and more accurate method of converting a curve into digital form.

While the foregoing specification emphasized the use of the improved encoder in a system for converting the coordinates of points along a curve into digital form, it will be realized that it could be used as part of the feedback link of a positioning system. In this case, the device to be positioned is carried by the reading head in the same manner as the stylus in the illustrated embodiments and this head is driven in the X and Y directions by a pair of servo control systems that receive digital input signals corresponding to the coordinates of the desired position. As the reading head and the device move in the X and Y directions, the encoder generates X and Y pulse trains which are fed back to the input side of the servo control and used to oppose the input signals. When the device reaches the desired position, the X and Y outputs of the encoder will just balance the digital input signals and the positioning servos will come to rest.

It should be understood that although the encoder of FIG. 1 which uses a transmission grid has been illustrated in conjunction with a cross head, this device may employ a reflection grid and be used with a free moving linkage of the type shown in FIG. 7. When the encoder uses a transmission grid with a free moving linkage, it is necessary to provide duplicate interconnected linkages so that the light source and the reading head, which are located at opposite sides of the grid, can be moved in synchronism. It also should be noted that in any of the embodiments of the invention either the grid or the reading head may be connected with and thus moved by the stylus.

Since the present invention includes a grid of either the reflection or the transmission type, it will be understood that the term "light-affecting characteristic" used in the claims is intended to be generic to both forms.

As stated previously, the drawings and description relate only to the preferred and several alternate embodiments of the invention. Since changes can be made in the structures of these embodiments without departing from the inventive concept, the following claims should provide the sole measure of the scope of the invention.

What is claimed is:

1. In combination (a) a pair of members movable relatively to each other in parallel planes;

(b) a pulse-generating grid parallel with said planes and carried by one of said members, the grid comprising first and second crossed sets of spaced parallel bands having one light-affecting characteristic and defining two crossed sets of parallel columns of spaced areas having a different light-affecting characteristic, the bands in each set and the spaces between them being of equal width;

(c) first and second photocells carried by the other member and each having an active face;

(d) a light source carried by the other member for illuminating a portion of the grid, the portion so illuminated depending upon the relative positions of the two members;

(e) first means carried by the other member for forming on the active face of the first photocell an image of a first section of the illuminated portion of the grid, the margins of the first section being parallel with the bands in the first and second sets, respectively, and the section having a dimension parallel with the bands in the first set equal to an even multiple of the width of the bands in the second set and a dimension parallel with the bands in the second set equal to an odd multiple of the width of the bands in the first set;

(f) second means carried by the other member for forming on the active face of the second photocell an image of a second section of the illuminated portion of the grid having margins parallel with the bands in the first and second sets, respectively, the second section having a dimension parallel with the bands in the first set equal to an odd multiple of the width of the bands in the second set and a dimension parallel with the bands in the second set equal to an even multiple of the width of the bands in the first set, (g) the light-affecting characteristics being so chosen that relative movement of the two members in directions parallel with the first and second sets of bands produces cyclic variations in the outputs of the second and first photocells, respectively.

2. The combination defined in claim 1 in which (a) the first means includes means for forming on the active face of the first photocell images of first additional sections of the illuminated portion of the grid which are in phase with the first section, the margins of each additional section being parallel with the bands in the first and second sets, respectively, and each additional section having a dimension parallel with the bands in the first set equal to an even multiple of the width of the bands in the second set and a dimension parallel with the bands in the second set equal to an odd multiple of the width of the bands in the first set; and (b) the second means includes means for forming on the active face of the second photocell images of second additional sections of the illuminated portion of the grid which are in phase with the second section, the margins of each of the second additional sections being parallel with the bands in the first and second sets, respectively, and each of said second additional sections having a dimension parallel with the bands in the first set equal to an odd multiple of the width of the bands in the second set and a dimension parallel with the bands in the second set equal to an even multiple of the width of the bands in the first set.

3. The combination defined in claim 1 which includes (a) a third photocell carried by the other member and having an active face;

(b) third means for forming on the active face of the third photocell an image of a third section of the illuminated portion of the grid, the margins of the third section being parallel with the bands in the first and second sets, respectively, and the third section having a dimension parallel with the bands in the first set equal to an even multiple of the width of the bands in the second set and a dimension parallel with the bands in the second set equal to an odd multiple of the width of the bands in the first set, the third section being out of phase with the first section by an amount other than 180°;

(c) a fourth photocell carried by the other member and having an active face; and (d) fourth means for forming on the active face of the fourth photocell an image of a fourth section of the illuminated portion of the grid, the margins of the fourth section being parallel with the bands in the first and second sets, respectively, and the fourth section having a dimension parallel with the bands in the first set equal to an odd multiple of the width of the bands in the second set and a dimension parallel with the bands in the second set equal to an even multiple of the width of the bands in the first set, the fourth section being out of phase with the second section by an amount other than 180°.

4. In combination (a) a pair of members movable relatively to each other in parallel planes;

(b) a pulse-generating grid parallel with said planes and carried by one of said members, the grid having regions which are good light reflectors and regions which are poor light reflectors, one of said regions being defined by first and second crossed sets of spaced parallel bands and the other of said regions comprising the two sets of parallel columns of spaced areas defined by the crossed bands, the bands and the spaces between them being of equal width;

(c) a pair of coaxial tubes normal to the grid and carried by the other member, one tube encircling the other and being spaced radially therefrom to define an intervening annular space;

(d) a light source carried by the other member;

(e) annular condensing lens means mounted in said annular space and arranged to converge light from the source and project it onto the grid;

(f) four photocells positioned adjacent one end of the inner tube and having active faces lying in a common plane and spaced circumferentially around the axis of the tubes;

(g) means defining four groups of spaced parallel light slits, one group underlying the active face of each photocell, the slits in two groups being parallel with the bands of the first set and out of phase with each other by an amount other than 180°, and the slits in the other two groups being parallel with the bands in the second set and out of phase with each other by an amount other than 180°, and (h) objective lens means positioned adjacent the other end of the inner tube and arranged to project an image of the illuminated portion of the grid through the slits and onto the active faces of the photocells, (i) the image-to-object ratio of the objective lens means being so correlated with the size of the slits that the image formed through each slit has a width proportional to an odd multiple of band width and a length proportional to an even multiple of band width, the factor of proportionality in both cases being the same.

5. The combination defined in claim 4 in which (a) both the condensing lens means and the objective lens means are used at an image-to-object ratio of 1:1; and (b) the back focal length of the condensing lens means is twice the front focal length of the objective lens means.

References Cited by the Examiner

UNITED STATES PATENTS

| | | | |
|---|---|---|---|
| 2,016,036 | 10/1935 | FitzGerald | 250—237 X |
| 2,838,683 | 6/1958 | Munro | 250—202 X |
| 3,114,046 | 12/1963 | Carbaniss et al. | 250—237 |

RAPH G. NILSON, *Primary Examiner.*

E. S. STRICKLAND, M. ABRAMSON, *Assistant Examiners.*